Aug. 5, 1958　　　　　H. S. JACOBS　　　　　2,846,601
BONDING COPPER TO STEEL IN A ROTOR BAR WINDING
Filed May 6, 1955　　　　　　　　　　　　　2 Sheets-Sheet 1

INVENTOR.
HENRY S. JACOBS
BY
Wheeler, Wheeler & Wheeler
ATTORNEYS

Aug. 5, 1958     H. S. JACOBS     2,846,601
BONDING COPPER TO STEEL IN A ROTOR BAR WINDING
Filed May 6, 1955     2 Sheets-Sheet 2
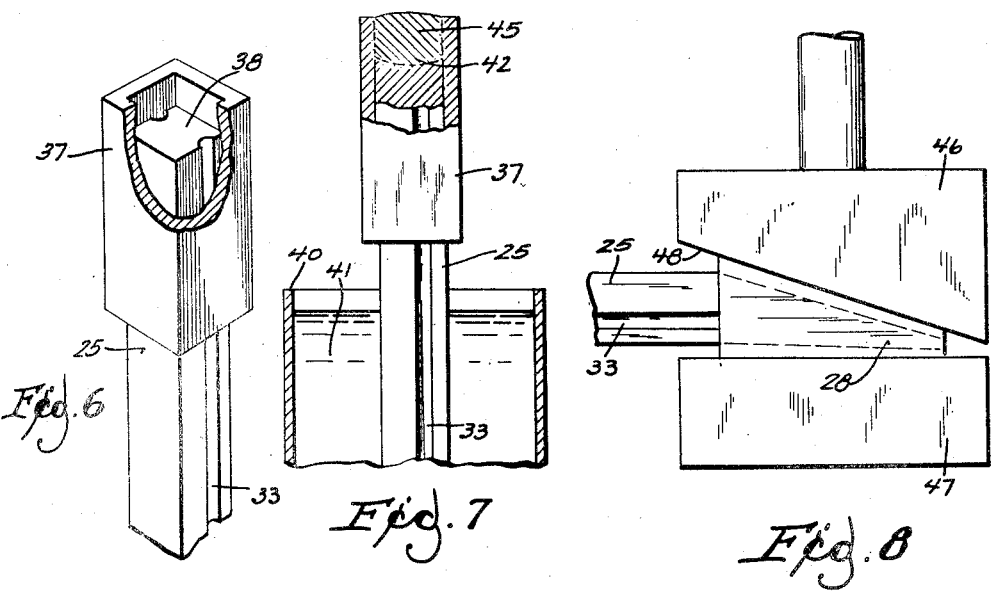
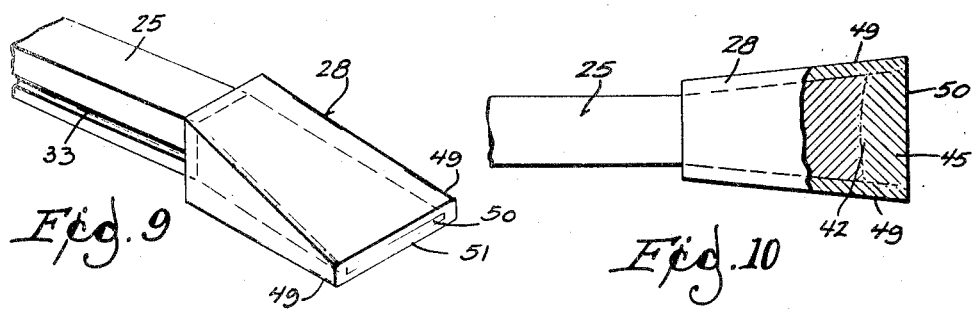
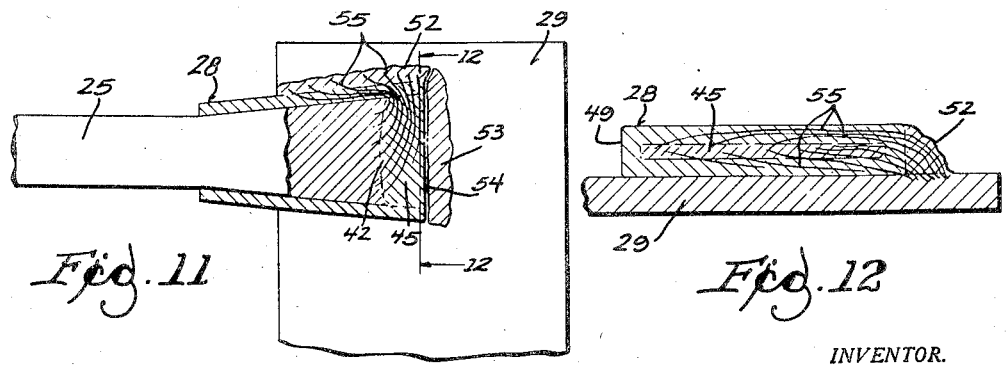
INVENTOR.
HENRY S. JACOBS
BY
Wheeler, Wheeler & Wheeler
ATTORNEYS

United States Patent Office 2,846,601
Patented Aug. 5, 1958

2,846,601

BONDING COPPER TO STEEL IN A ROTOR BAR WINDING

Henry S. Jacobs, Milwaukee, Wis., assignor to Harnischfeger Corporation, Milwaukee, Wis., a corporation of Wisconsin Application May 6, 1955, Serial No. 506,643

20 Claims. (Cl. 310—211)

This invention relates generally to bonding copper to steel and more specifically to rotor construction and to a method of bonding a rotor bar to a rotor fin.

Induced current torque transmitting couplings of the type shown in my copending application Serial No. 400,941, develop high operating core temperatures which may reach 350° C. at the center of the core and 300° C. in the rotor bars. The coupling rotor may rotate at a high speed at which the centrifugal force tending to throw a single rotor bar out of its rotor slot may be as high as fifteen hundred pounds. Accordingly, it is desirable that the rotor bars be securely locked to the rotor and that the method of bonding the bars to their induced current members be such as not to soften the copper in the bonding process and thereafter at the high operating temperatures aforesaid.

An important object of the present invention is to provide a rotor construction in which copper rotor bars have good mechanical and electrical connection to steel rotor fins whereby the connection will resist dislocating forces and at the same time insure good current conduction between the bar and the fin. Conventional procedures will not ordinarily result in a satisfactory electrical and mechanical bond between copper and steel.

The invention resides broadly in my method and structure resulting from the steps of internally bonding a copper rotor bar to a steel ferrule for good electrical connection therebetween, deforming the ferrule and included copper bar into a wedge shape for good mechanical connection therebetween and bonding the ferrule to a steel plate such as an induced current heat dissipating fin.

In the drawings:

Fig. 6 is a diagrammatic perspective view showing the first step in my method of bonding a copper rotor bar to a steel ferrule.

Fig. 7 is a fragmentary view, partly in cross section, showing the parts of Fig. 6 after the weld has been completed and a water tank in which the copper bar may be immersed during the bonding step.

Fig. 8 is a diagrammatic view illustrating the step of deforming the ferrule and included copper bar as the next step in my method.

Fig. 9 is a perspective view showing the deformed ferrule and included copper bar after the completion of the deforming step illustrated in Fig. 8.

Fig. 10 is a longitudinal cross section taken through the deformed ferrule of Fig. 9.

Fig. 11 is a longitudinal cross section taken through the ferrule and its welds to a steel plate.

Fig. 12 is a cross section taken on the line 12—12 of Fig. 11.

Figure 1:
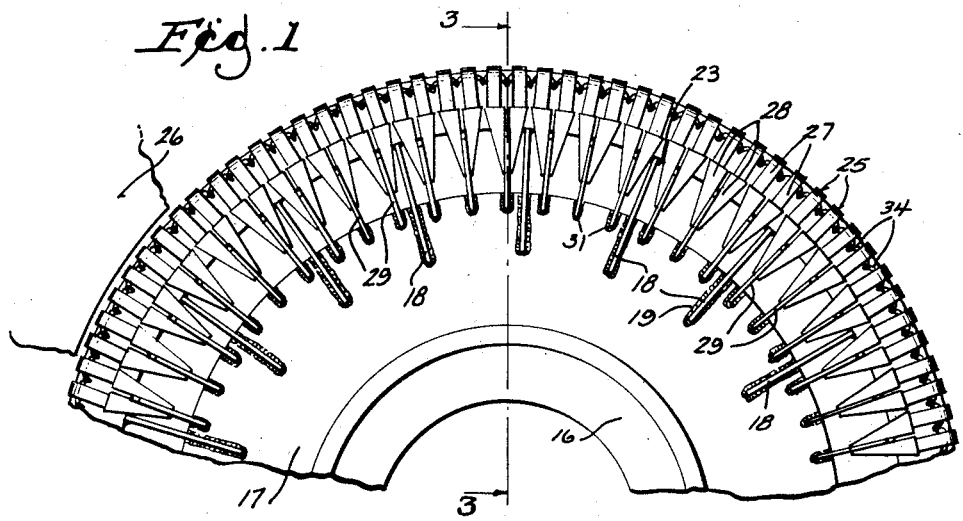
Fig. 1 is a fragmentary side elevation of a rotor having bars and fins embodying my invention, a portion of a stator being fragmentarily illustrated.
Figure 2:
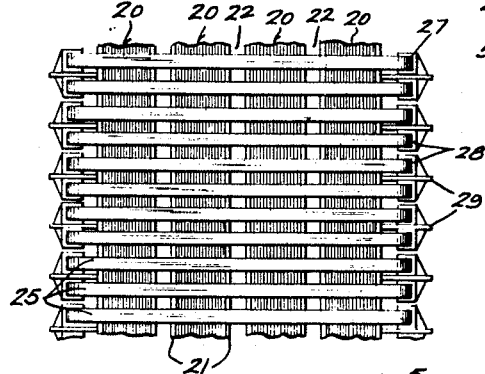
Fig. 2 is a fragmentary developed plan of the air gap surface of the rotor.
Figure 3:
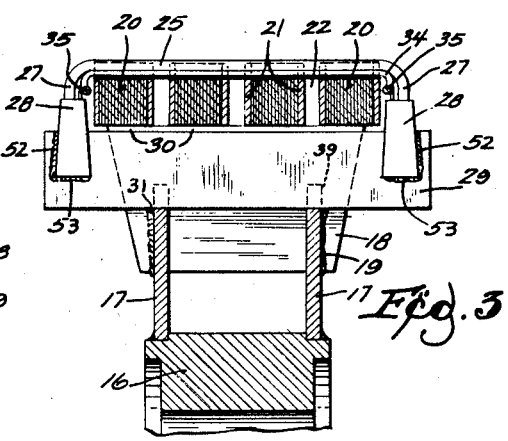
Fig. 3 is a cross sectional view taken on the line 3—3 of Fig. 1.

As best shown in Figs. 1 through 5, the present invention is advantageously practiced in the fabrication of a rotor for an induced current torque transmitting coupling. The rotor comprises a hub 16 having axially spaced annular diaphragm plates 17 welded thereto. To the diaphragm plates are welded at 19 radial support fins 18 which extend axially to bridge the plates 17 and which are spaced peripherally about the rotor. The outer radial margins of the fins 18 are welded at 23 to the inner periphery of the magnetic rim or annulus of the rotor. As best shown in Figs. 2 and 3, the magnetic rim or annulus comprises stacked laminations 20 arranged in spaced groups to provide ventilating gaps or channels 22 therebetween. Each group of laminations is bounded by side laminations 21 which are materially thicker than the intermediate laminations 20. In the structure just described there is no need for additional bracing between the respective groups of laminations as the relatively heavy gauge side plies 21 have adequate mechanical strength to preclude axial shifting of the laminations which might otherwise occur under thermal stress to block passage of cooling air through the cooling channels 22.

The outer periphery or air gap surface of the magnetic rim is axially slotted to receive copper rotor bars 25 which have their top faces substantially flush with the outer periphery of the rotor rim. The end portions of the rotor bars 25 are downturned radially at 27 and are electrically and mechanically bonded to ferrules 28 according to my novel method hereinafter described. Each ferrule is tapered or thinned toward one end in one plane and flared toward said end in a transverse plane. The ferrules in turn are mechanically and electrically bonded to resistance fins 29 which extend radially toward the inner periphery of the laminated rim and are seated in radial slots 39 in the outer edges of the annular plates 17. The fins are welded to the annular plates at 31 but clear the inner periphery of the rim at 30 to thermally insulate the fins from the laminations. In practice the clearance between fins 29 and the inner periphery of the rim is approximately one-half inch.

Figure 4:
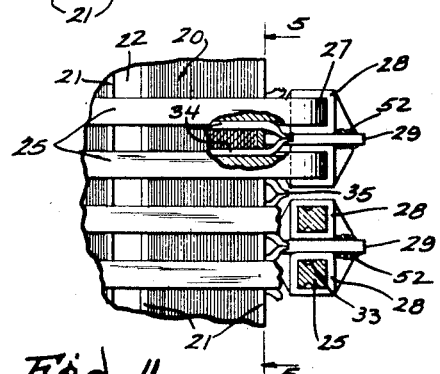
Fig. 4 is an enlarged fragmentary plan of the air gap surface of the rotor, portions being cut away and shown in cross section.
Figure 5:
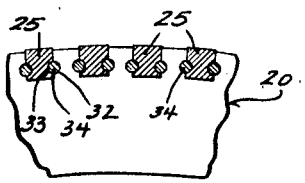
Fig. 5 is a cross sectional view taken along the line 5—5 of Fig. 4.

As best shown in Figs. 4 and 5, the laminations 20 and the copper bars 25 are respectively provided with registering grooves 32, 33 which receive steel wire splines 34 to interlock the bars with the laminated rim. The splines between adjacent bars may be interconnected at their ends by welds 35, thereby securing them against axial movement.

As hereinbefore indicated, the specific structure illustrated in the drawing is that of an induced current torque transmitting coupling. The rotor and stator 26 rotate at different speeds. Accordingly, the field of the stator will induce in the rotor bars 25 current which will generate heat in the fins 29. The heat thus generated will ultimately be carried away by convection currents. Considerable heat is also generated within the copper bars. Since temperatures in the bars may reach 300° C., it is very important to preserve the hardness and strength of the copper bars in order to resist centrifugal dislocation. Ordinary hardened copper bars, however, lose their hardness at temperatures above about 200° C. Accordingly, I prefer to employ copper for my rotor bars to which a small quantity of silver has been added, thereby greatly increasing the resistance of the copper to softening at elevated temperature. The addition of ten ounces of silver to a ton of copper results in a copper bar which will retain its hardness at temperatures up to 325° C.

An important feature of my invention is to provide good electrical conduction between the bars 25 and fins 29, thus keeping the I²R loss in the connection to a minimum. Accordingly, generation of heat is localized to the fins 29. For this purpose I bond the copper bars to the steel ferrules 28 and to the steel fins 29 in such a way that a good electrical bond is produced. A good electrical connection between the copper bar, steel ferrule and steel fin, however, has very little mechanical strength. Accordingly, my bonding method includes provision for the protection of the electrical connection by a good mechanical connection which does not depend upon the electrical connection for mechanical strength.

My novel bonding method is best illustrated in Figs. 6 through 10. The first step of my method is shown in Figs. 6 and 7. Here a square cross section copper bar 25 which has been pre-hardened to above 65 Rockwell scale F by extrusion or otherwise is inserted into a square cross section sleeve 37 of which the ferrules 28 will ultimately be formed. The end 38 of the copper bar 25 is desirably spaced from the end of the sleeve 37. It is desirable to maintain the hardness of the bar during and after its bonding to the sleeve 37. Accordingly, I prefer to use welding apparatus in which heat is localized at the weld. While I have used a S. I. G. M. A. welder for this purpose, I prefer to use the heli-arc process of welding bar end 38 to the inner walls of sleeve 37. Accordingly, the heat is concentrated at the tip of the bar and not enough heat is transmitted to the portion of the bar outside the sleeve to materially soften it. If desired, I may immerse the portion of the bar 25 beyond the sleeve 37 in a tank 40 of coolant, such as water 41, to carry away such heat as reaches the immersed portion of the bar. An alternative to maintaining the portion of the bar 25 beyond the sleeve immersed in tank 40 during the welding process is to weld the bar to the sleeve without reference to coolant and thereafter quench the bar and sleeve to rapidly dissipate heat.

The inert electrode of the heli-arc welder is first touched to the bar end, copper thus melted from the bar being indicated by reference character 42. I may then add copper melted by the active electrode of the heli-arc welder. Copper melted by the active electrode will fuse with the previously melted copper 42. The added copper is indicated by reference character 45. The localized heating of the sleeve at the end of the copper bar and the fusing of the melted copper 42 and 45 will result in a good electrical connection between the copper bar 25 and the steel sleeve 37. However, as is common with welded connections of copper to steel, this joint has relatively little mechanical strength.

To protect the good electrical connection thus made, I provide in the next step of fabrication a mechanical bond between the bar and the sleeve which rigidifies the entire structure but which is independent of the electrical connection aforesaid. This is accomplished by deforming the sleeve to its ultimate ferrule shape 28 shown in Fig. 9. In Fig. 8 I illustrate upper and lower dies 46, 47. Die 46 has a lower face 48 inclined with respect to the upper face of die 47. Die 46 may be actuated by the ram of a conventional hydraulic press and exerts a closing pressure which may range upwardly from sixty tons. This pressure flattens and widens the sleeve to its ferrule shape shown in Fig. 9.

In the pressure step the side margins 49 of the sleeve and the enclosed bar are diverged or formed outwardly toward the end of the ferrule to wedge the bar in the ferrule and preclude its withdrawal therefrom. The pressure step also increases the hardness of the copper which was previously melted in the bonding step and reduces the volumetric capacity of the sleeve so as to increase the pressure of the included copper against the walls of the ferrule. The pressure step also increases the area of the lower face of the ferrule to improve its electrical and mechanical connection to the fin as hereafter explained, and reduces the thickness of practically the entire area of the ferrule for clearance between ferrules and support fins when the ferrules are welded to the resistance fins and to improve electrical conductivity to the fins. Moreover, as best shown in Fig. 9 the thickness of the copper tip 50 exposed at the end 51 of the ferrule is reduced so that its thickness is a minor percentage of the aggregate thickness of the ferrule tip, and desirably does not exceed twenty percent of the aggregate thickness of the ferrule tip.

Because of the volumetric reduction aforesaid, some copper may be extruded from the end of the ferrule. Such extruded copper is removed prior to the next step in my method, which is to bond the ferrule to the rotor fin.

The copper bar 25 having ferrules 28 bonded to both its ends may now be shaped to its configuration shown in Fig. 3 in which its ends 27 are bent at right angles to the main portion of the bar. The bars may then be positioned in the rotor slots and the splines 34 inserted. As best shown in Figs. 1 and 4, each fin 29 serves two adjacent rotor bars 25. Adjacent rotor bars, accordingly, are so positioned to dispose the broad flat faces of their ferrules against opposite sides of the fins, the inclined faces of the ferrules being oppositely disposed and clearing any intervening support fin 18. After positioning, the ferrules 28 are welded to the fins 29, welds being applied along a side margin of the ferrules at 52 and along the end margin of the ferrules at 53. This welding may be done by a conventional electric arc welder.

Weld 52, which bonds the steel ferrule to the steel fin, is relied on primarily for mechanical strength between the ferrule 28 and the fin 29. Weld 53, which bonds the copper tip 50 of the bar to the steel fin, is relied upon primarily for good electrical connection between the ferrule and the fin. The relative thinness of the exposed tip 50 of the included copper bar is important in that a relatively large area of exposed copper might cause substantial intermixture of copper with the weld to contaminate the weld and result in cracking thereof under thermal and mechanical stress. By keeping the exposed area of the copper tip to a minor percentage of the aggregate thickness of the ferrule end, material intermixture of copper with the weld metal will not occur and the weld will withstand cracking stresses. In this connection, it is also desirable that welds 52 and 53 be formed with a low carbon steel weld rod. This is to provide a relatively pure iron path for current flow between the steel fin and the steel ferrule and included copper bar. An iron path has less electrical resistance than steel, although its strength is not as great. There will be some intermixture of steel from the melted surface of the fin and the weld rod during welding in any event, but the resultant weld will be a better conductor than if a steel weld rod were used.

Figs. 11 and 12 illustrate the condition when weld 53 has cracked under thermal or mechanical stress and is electrically separated from the copper bar by fissure 54. Electrical current now passes between the fin and copper bar only along the paths indicated by lines 55 between the tip end of the bar (in good electrical connection with the ferrule wall 49) through the ferrule wall and through weld 52 and the fin 29. In order to transmit this current flow without excessive local heating of the ferrule, and to insure adequate mechanical strength thereof, I have found that the ferrule should have a wall which is not less than one-sixteenth of an inch in thickness and is desirably about one-eighth of an inch in thickness.

The desirable result may be expressed by stating that the weight of the steel ferrule should be approximately equal to the weight of the copper enclosed thereby. If the proportion of steel is much less than fifty percent of the total, localized excessive heating may occur under the foregoing specialized conditions.

On the other hand, if the proportion of steel to copper is much in excess of fifty percent of the total, the coupling becomes unnecessarily heavy and the weld must be heavier than would otherwise be required. Under these circumstances the heat generated in the welding operation will result in undesirable softening of the copper bar.

Moreover, the combined length of the welds 52 and 53 desirably should not exceed five times the average thickness of the copper bar. Under these circumstances the welds 52 and 53 may be completed in one pass in normal atmosphere without an undue increase in temperature which might otherwise soften the copper.

For the same reason, I have found it desirable to regulate the dimension of the fin 29 so that its extent beyond weld 52 and weld 53 is not less than three times the thickness of the ferrule wall. The exposed surface of the fin thus extending beyond the ferrule will dissipate heat generated in the welding operation. Accordingly, the copper temperature will not rise above the point where the copper will soften. In practice I prefer to extend the fin beyond the welds from six to eight times the thickness of the ferrule wall.

As before indicated, by far the greatest percentage of the total current will flow from bar 25 through the end of the ferrule and weld 53 into the fin 29. Very little current will normally flow through the weld 52 unless weld 53 cracks. Such current as does flow through weld 52 will follow the path of least resistance through the good electrical connection between the ferrule wall and the tip of the bar at zones 42 and 45 shown in Fig. 10. By flattening the ferrule and bar, particularly at its tip, in the pressure step, the portion of the bar having a good electrical bond to the ferrule is proximate the fin and the current path from the included copper in the ferrule to the fin is much shorter than would be the case if the ferrule was not deformed.

Fins 29 may be of steel or of "Roslyn" metal, a proprietary product of the Joseph Kinney Company of Roslyn, Pennsylvania, and consisting of an interior ply of copper to which is laminated external plies of stainless steel.

The superior mechanical connection of the rotor bars 25 to the fins 29 achieved in the method aforesaid, together with the splined interlock of the bars with the laminated rim of the rotor, insures mechanical retention of the bars in their slots under all conditions and speeds of rotor operation. The good electrical connection between the bars and the fins insures generation of heat primarily in the fins where it is readily dissipated by convection currents. Accordingly, the temperature of the copper bar does not rise to the point where the bar may fail mechanically because of thermal softening.

While the foregoing description related primarily to an electromagnetic coupling embodiment in which the invention has solved pressing problems, the invention is applicable to the construction of any rotor in the electromotive machinery art, and broadly to any instance where copper is to be bonded to steel.

I claim:

1. In a magnetic torque coupling device a rotor comprising an annulus of magnetic material having means supporting it for rotation and provided along its inner and outer peripheries with axially extending electrically conductive elements, the elements along the outer periphery of said annulus having substantially radially inturned ends comprising solid electrically conductive bars mechanically and electrically connected with the elements along the inner periphery of said rotor for the completion of current paths about said annulus, said elements along the inner periphery of the rotor being characterized by high operating temperatures, said couplings comprising ferrules to which the ends of the bars are internally bonded to provide good electrical connection between said ends and the inner elements, the ferrules and the said solid bar ends having correspondingly divergent sides in dovetailed connection whereby to resist dislocating stresses longitudinally of said connection, said ferrules being externally bonded to the inner elements.

2. The device of claim 1 in which the means mounting said rotor for rotation includes a hub, said inner elements extending substantially radially from the hub, said annulus comprising axially spaced groups of annular laminations, each group including relatively heavy laminations at its sides axially confining the inner laminations against thermal expansion of said laminations into the spaces between groups.

3. A method of the character described and comprising the steps of positioning a pre-hardened solid copper bar in a tubular steel ferrule, applying localized heat to the end of the copper bar within the ferrule to melt said end without materially softening the portion of the bar which extends from the ferrule and weld said melted copper to said ferrule to couple the bar and ferrule in good electrical connections, plus the subsequent step of deforming the ferrule and included solid bar portion to diverge the side margins of the bar and ferrule into the shape of a dovetail to interlock the coupled parts in good mechanical connection and resist dislocating stresses longitudinally of the connection.

4. The method of claim 3 followed by the step of juxtapositioning the deformed ferrule with respect to a sheet of steel to which the ferrule is to be connected with the one side of the ferrule in face relation to the sheet, and welding the ferrule to said sheet along a side and end margin thereof.

5. The method of claim 4 in which the thickness of the ferrule wall is not less than one-sixteenth of an inch.

6. The method of claim 4 in which the weight of the ferrule is substantially equal to the weight of the portion of the copper bar enclosed therein.

7. The method of claim 4 in which the combined length of the weld along the side and end margin of the ferrule does not exceed five times the average thickness of the copper bar.

8. The method of claim 4 in which the tip of the ferrule and included copper is deformed to a thickness in which the thickness of the copper is a minor percentage of the aggregate thickness of the ferrule tip and copper.

9. The method of claim 4 in which the ferrule is positioned on the sheet so that the margin of the sheet extending beyond the weld is not less than three times the thickness of the ferrule wall.

10. A method of mechanically and electrically bonding a solid copper bar to a steel ferrule comprising the steps of positioning the bar in the ferrule with the end of the bar spaced from the end of the ferrule, applying localized heat to the end of the bar enclosed by the ferrule to melt said end, and adding enough melted copper to substantially fill said space, plus the step of deforming the ferrule and its enclosed solid copper bar to diverge the side margins of the ferrule and included bar into the shape of a dovetail to interlock the bar and ferrule in good mechanical connection to resist dislocating stresses imposed in a direction longitudinally of the coupled parts and concurrently harden the copper previously softened by the melting step.

11. A method of bonding a steel ferrule and included copper bar to a steel plate comprising the steps of flattening the ferrule and included bar to a dimension in which the exposed tip end of the copper bar does not exceed a minor percentage of the thickness of the ferrule tip, juxtapositioning the ferrule in face contact with a steel plate with the ferrule tip at an angle to said plate, and welding the end of the ferrule to said plate to bond the plate to the copper tip without substantial intermixture of copper with the weld metal.

12. The method of claim 11 in which the welding step is performed with an electric arc welder using a low carbon content weld rod to limit the percentage of carbon in the completed weld.

13. An electrical and mechanical joint between a steel plate and a copper bar, said joint comprising a ferrule, said ferrule, having a flat side in face contact with the plate and a bore within which one end of the bar is enclosed, the end of said ferrule being open to expose the copper tip therethrough, a weld between the tip of the copper bar and the tip of the ferrule for good electrical connection therebetween, said ferrule and included copper bar being wedge-shaped in plan to mechanically preclude withdrawal of the bar from the ferrule, the ferrule and included bar being tapered in side elevation whereby the tip of the ferrule and included bar is reduced in thickness to shorten the path of current flowing between the bar and plate.

14. The device of claim 13 in which the thickness of the included copper at the tip end of the ferrule is less than a minor percentage of the aggregate thickness of the copper and ferrule.

15. The device of claim 13 in which the weight of the ferrule and included copper bar is substantially equal.

16. The device of claim 13 in which the copper bar is internally welded to the wall of the ferrule only at an end portion thereof, the wall of the ferrule having a thickness not less than one-sixteenth of an inch to provide an adequate path for electrical current flowing longitudinally and laterally through the wall of the ferrule between the plate and the bar.

17. In a device of the character described and characterized by high operating temperatures, a rotor comprising a rim of magnetic material having inner and outer peripheries, the outer periphery of the rim being axially slotted, conducting members extending along the inner periphery of the rim, solid rotor bars seated in the rim slots and having radially inturned ends, said rotor bars being subject to centrifugal force of rotor movement tending to throw the bars out of said slots and mechanical and electrical couplings between said rotor bar ends and said members whereby to complete induced current paths through coupled bars and members and mechanically anchor said bars in said slots against dislocating forces, said couplings comprising ferrules to which the ends of the bars are internally welded to provide good electrical connection between the bars and ferrules, said ferrules and included bar ends having side margins which diverge distally in dovetailed connection whereby to provide good mechanical connection between the bars and ferrules and resist dislocating stresses longitudinally of said connection, said ferrules being externally welded to said members.

18. The device of claim 17 in which said rotor bars have grooved side margins, said rim being provided with registering grooves, and locking splines seated in said registering grooves whereby to lock the portions of the bars within the rim slots to said rim.

19. In a magnetic torque coupling device of the type subject to high operating temperatures and comprising a hub, generally radial plates supported from the hub and groups of annular laminations carried by said plates from the hub and encircled by electrically conductive means including axially extending bars circumferentially spaced about the outer periphery of said laminations and generally radial plates extending axially of the inner periphery of said laminations and circumferentially spaced about such inner periphery, the improvement which consists of anchoring radially inwardly turned ends of said bars to said plates mechanically as well as electrically, such ends being engaged in ferrules and the ends and ferrules having wedge-shaped form with laterally divergent margins for which said plates provide complementary anchorage means engaging the flaring ends of the ferrules, the bars comprising copper and the ferrules comprising a ferrous material, the bars and ferrules being welded together for adequate electrical connection, the divergent margins of the bar ends and ferrules supplying additional mechanical strength to resist dislocating stresses longitudinally of said couplings.

20. The device of claim 19 in which said ferrules are open at their ends to expose the included copper bars, and welds connecting said ferrules and plates, said welds being directly engaged with said exposed copper bar tips for good electrical connection between the bars and plates.

References Cited in the file of this patent

UNITED STATES PATENTS

| | | |
|---|---|---|
| 412,410 | Patterson | Oct. 8, 1889 |
| 1,353,237 | Hoffman et al. | Sept. 21, 1920 |
| 1,394,604 | Bovard | Oct. 25, 1921 |
| 1,443,082 | Mauck | Jan. 23, 1923 |
| 1,553,511 | David | Sept. 15, 1925 |
| 1,610,506 | Fletcher | Dec. 14, 1926 |
| 2,251,820 | Cadwell | Aug. 5, 1941 |
| 2,288,348 | Funk | June 30, 1942 |
| 2,333,046 | Sabol | Oct. 26, 1943 |

FOREIGN PATENTS

| | | |
|---|---|---|
| 189,470 | Great Britain | Jan. 3, 1924 |
| 243,902 | Great Britain | Dec. 10, 1925 |
| 903,011 | Germany | Feb. 1, 1954 |